United States Patent
King et al.

(10) Patent No.: US 6,351,709 B2
(45) Date of Patent: *Feb. 26, 2002

(54) VEHICLE NAVIGATION SYSTEM WITH ROUTE UPDATING FEATURE

(75) Inventors: Joseph D. King, Ann Arbor; Stephen J. Learman, Saline; Steven R. Keyes, Bloomfield Hills, all of MI (US)

(73) Assignee: Lear Automotive Dearborn, Inc., Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,410

(22) Filed: Dec. 2, 1998

(51) Int. Cl.[7] ............................................... G01C 21/34
(52) U.S. Cl. ........................ 701/210; 701/209; 340/990; 340/995
(58) Field of Search ........................... 701/14, 117, 200, 701/207, 208, 209, 210, 213; 73/178 R; 340/988, 990, 995; 342/454, 456

(56) References Cited

U.S. PATENT DOCUMENTS

| | | | | |
|---|---|---|---|---|
| 4,706,086 A | * | 11/1987 | Panizza ...................... | 701/117 |
| 5,351,194 A | * | 9/1994 | Ross et al. ................... | 701/213 |
| 5,369,588 A | * | 11/1994 | Hayami et al. ............. | 701/209 |
| 5,371,678 A | * | 12/1994 | Nomura ...................... | 701/117 |
| 5,428,544 A | * | 6/1995 | Shyu ........................... | 701/117 |
| 5,428,545 A | * | 6/1995 | Maegawa et al. ........... | 701/210 |
| 5,699,056 A | * | 12/1997 | Yoshida ....................... | 701/117 |
| 5,774,827 A | | 6/1998 | Smith, Jr. et al. ............ | 701/209 |
| 5,862,509 A | * | 1/1999 | Desai et al. ................. | 701/210 |
| 5,875,412 A | * | 2/1999 | Sulich et al. ................ | 701/210 |
| 5,892,463 A | * | 4/1999 | Hikita et al. ................. | 701/209 |
| 5,911,773 A | * | 6/1999 | Mutsuga et al. ............. | 701/210 |
| 5,919,246 A | * | 7/1999 | Waizmann et al. .......... | 701/210 |

* cited by examiner

*Primary Examiner*—Gary Chin
(74) *Attorney, Agent, or Firm*—Niro, Scavone, Haller & Niro

(57) ABSTRACT

A vehicle navigation system includes an update module that provides travel advisory information on a real time basis. The update module receives traffic advisory signals such as intelligent highway system signals, safety warning system signals and specially encoded traffic reports from radio stations. The travel advisory signals are utilized by the navigation system to provide a route guidance strategy to a driver that is not limited by the information from a prestored map database. While travelling, the update module continues to provide information that is utilized to generate an updated route as appropriate. Additionally, the vehicle navigation system preferably includes the ability to generate a beacon signal indicating that the vehicle is in a position or condition that presents a potential traffic hazard to other drivers. The beacon signal from the navigation system of this invention is one example of the kind of travel advisory signal that the inventive navigation system uses to generate an updated route guidance strategy.

17 Claims, 1 Drawing Sheet

VEHICLE NAVIGATION SYSTEM WITH ROUTE UPDATING FEATURE

BACKGROUND OF THE INVENTION

This invention generally relates to vehicle navigation systems and more particularly to a vehicle navigation system that includes the ability to update a chosen route strategy given current road or traffic conditions, for example.

Navigation systems are becoming increasingly popular on passenger vehicles. Typical navigation systems utilize a satellite-based global positioning system and a prestored map database that includes a number of established reference points. A variety of topologies and navigational algorithms are utilized to provide a navigation solution or route strategy that guides a vehicle operator to a chosen destination. The navigation system determines a current position of the vehicle based upon signals received from the satellite-based global positioning system. The position information and the chosen destination are then utilized to determine a route strategy to reach the desired destination based upon the prestored map database.

Although navigation systems are becoming more popular and have proven useful, they are not without limitations. One major shortcoming is that prestored map databases become at least partially obsolete very soon after they are distributed. The primary factors that render a map database effectively obsolete include road construction, weather conditions, accidents and changes in the locations of roads or permissible travel patterns along roads. An attempt at addressing these problems includes providing periodic updates to map databases. These updates, however, are prohibitively expensive and insufficient under many circumstances because it is impossible to predict the location and effect of weather conditions and traffic accidents, for example.

One proposed enhancement has been to utilize cellular communication networks to provide updated travel information. Such systems still have drawbacks including expensive monthly fees for cellular network access and overcrowded communications associated with limited cellular communication resources.

This invention addresses the need for having a navigation system that provides an optimum route strategy that takes into account road conditions on a real time basis. This invention provides greater flexibility and effectiveness for vehicle navigation systems.

SUMMARY OF THE INVENTION

In general terms this invention is a vehicle navigation system that includes route guidance updating features that are useful on a real time basis.

A navigation system designed according to this invention includes several basic components. An input device allows a driver to input a desired destination or location. A receiver is supported on the vehicle that receives signals that indicate a current position of the vehicle. A memory module is supported on the vehicle that contains a prestored map database that includes a plurality of known location reference points. An update module receives at least one travel advisory signal that indicates a current traffic situation that is not accounted for in the prestored database. An electronic controller supported on the vehicle communicates with the input module, the receiver, the memory module and the update module to generate a route guidance strategy to guide the driver from a current position to the desired destination.

Additionally the electronic controller utilizes further travel advisory signals and determine whether the current traffic situation affects previously generated route guidance strategy. Whenever appropriate, the electronic controller automatically generates an updated route guidance strategy taking into account the current traffic situation.

A navigation system designed according to this invention preferably includes a transmitter supported on the vehicle that transmits a beacon signal indicating that the vehicle is in a condition or position that presents a potential traffic hazard for other vehicles. The transmitter beacon signal preferably is generated whenever the driver activates the hazard lights of the vehicle. Alternatively, the beacon signal is automatically generated by the system electronic controller when certain preselected conditions are satisfied. The beacon signal from one vehicle is one type of travel advisory signal that is received by navigation systems designed according to this invention and placed in other vehicles, which utilize that information to generate updated route guidance strategies.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
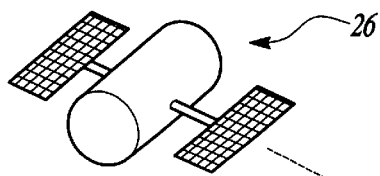
FIG. 1 diagrammatically illustrates a vehicle navigation system designed according to this invention.

FIG. 1 shows a vehicle 20 having a navigation system 22 supported onboard the vehicle. An antenna 24 facilitates communication between the navigation system 22 and a satellite-based global positioning system diagrammatically illustrated at 26. Importantly, this invention is not limited to satellite-based global positioning systems, but also includes without being limited to utilizing dead reckoning and map matching technologies or some combination of location systems. Global positioning, dead reckoning and map matching systems are known to those skilled in the art.

Figure 2:
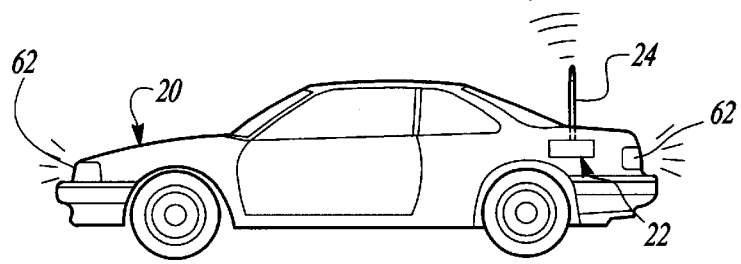
FIG. 2 schematically illustrates more details of a vehicle navigation system designed according to this invention.

FIG. 2 schematically illustrates more details of the vehicle navigation system 22. A position receiver 30 receives signals from the positioning system 26 located remotely from the vehicle 20. The signals received by the receiver 30 provide an indication of a current position of the vehicle. An electronic controller 32 processes the signals received by the receiver 30 and utilizes a prestored map database from a memory module 34 to determine the current location or position of the vehicle.

An operator interface 36 preferably includes a display screen 38 (see FIG. 3) and a plurality of input switches 40 to facilitate interaction between a vehicle operator or driver and the navigation system 22. For example, the vehicle operator uses the input switches 40 to indicate a desired destination location. The controller 32 preferably is programmed to utilize the information gathered through the receiver 30 and the map database stored in the memory module 34 to generate a display on the screen 38 indicating, for example, a map showing the determined route guidance strategy to guide the vehicle operator from a current position to the desired destination.

The system of this invention presents a substantial improvement over prior navigation systems in that it includes an update module 50. In the embodiment illustrated in FIG. 2, the update module includes a receiver portion 52 and a transceiver portion 54. In the preferred embodiment, a plurality of travel advisory signals are received by the receiver 52 and/or the transceiver 54. Example travel advisory signals include road condition updates available through intelligent highway systems, safety warning systems and specially encoded traffic reports from radio stations, for example. The travel advisory signals preferably provide indications of construction zones, traffic jams, accidents or other road hazards (such as may be caused by weather conditions). These types of signals are known to those skilled in the art. Given this description, appropriate components to realize the receiver 52 and transceiver 54 can be chosen from among commercially available components and systems.

The travel advisory signals are utilized by the controller 32 to determine the route guidance strategy. Later, when the vehicle is in route, the controller 32 communicates with the update module 50 to determine whether the route guidance strategy that has been presented to the driver should be updated. For example, when a route guidance strategy includes travelling down a specific highway and a travel advisory signal received by the receiver 52 indicates that there is an accident on that highway, the controller 32 can utilize that information and the prestored map database in the memory module 34 to generate an updated, alternate route guidance strategy.

In the preferred embodiment, the controller 32 preferably periodically polls the update module 50 to determine whether any travel advisory signals have been received that would warrant updating the route guidance strategy provided to the driver. In the preferred embodiment, the controller 32 automatically provides an indication to the driver that a travel advisory signal has been received and that an updated route guidance strategy should be implemented.

Figure 3:
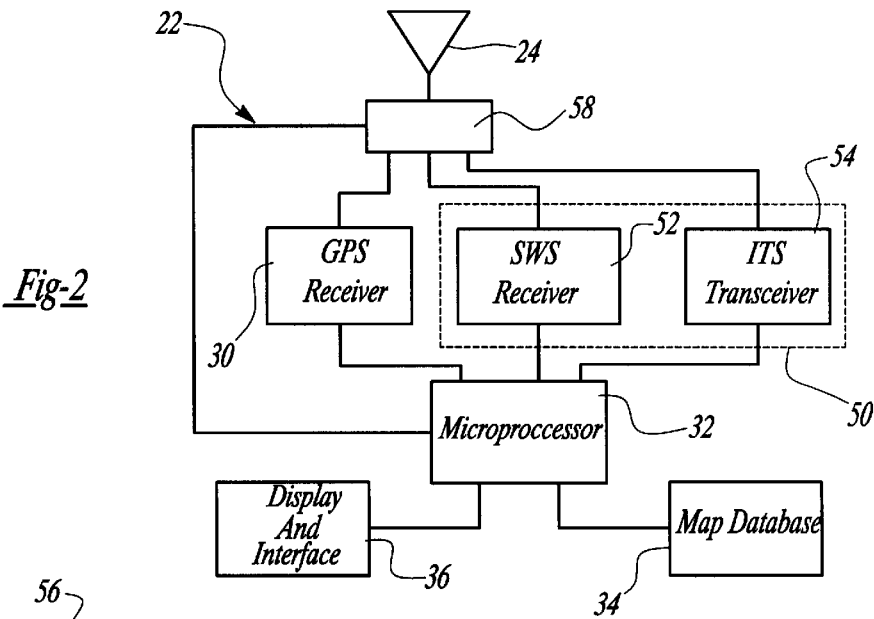
FIG. 3 diagrammatically illustrates preferred features associated with the vehicle navigation system of this invention.
Figure 3:
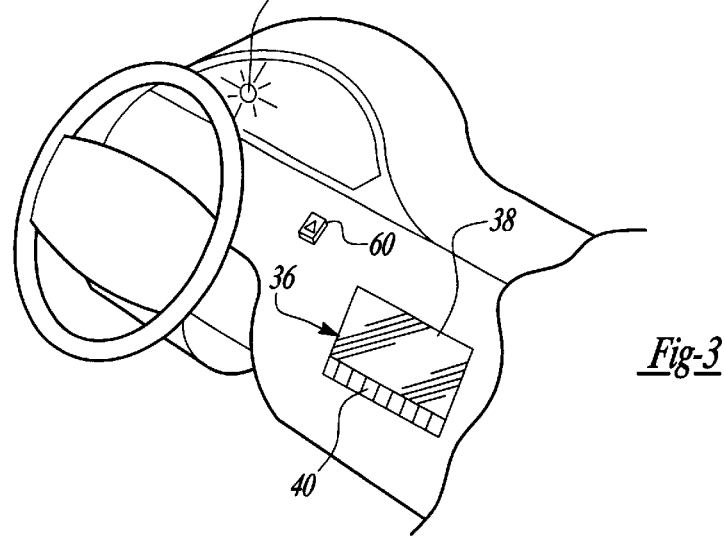

FIG. 3 shows one example of the type of indication provided by the controller 32. A light indicator 56 on the instrument panel of the vehicle preferably is activated when the controller 32 determines that a travel advisory signal warrants updating the route guidance strategy. Alternatively, the display 38 can be used to generate messages to the driver indicating, not only that an updated route guidance strategy is in order but also the type of information gathered through the travel advisory signal, such as the fact that an accident is ahead on the anticipated route.

The controller 32 is capable of automatically or autonomously generating an updated route guidance strategy. The driver preferably has the option of choosing to have an updated strategy presented and to have secondary alternate strategies generated in the event that the driver does not approve of the updated strategy.

Since the update module 50 preferably is activated to constantly receive travel advisory signals as they become available, the controller 32 is able to update the route guidance strategy on a real time basis. Therefore, a navigation system designed according to this invention provides the substantial advantage of having a prestored map database that is effectively updated on a real time basis given current traffic conditions. In one example, the controller 32 continuously monitors the travel advisory signals received through the update module 50. In another example, the travel advisory signals are monitored on a periodic basis.

A navigation system designed according to this invention preferably not only receives update travel advisory signals but also provides a beacon signal that serves as one example of the travel advisory signals discussed above. The transceiver 54 preferably is programmed to selectively generate a beacon signal under certain conditions. A switching device 58 preferably is provided that responds to the electronic controller 32 when the antenna 24 should be used to transmit the beacon signal from the transceiver 54.

The beacon signal is especially useful when a vehicle operator realizes that the vehicle is in a position or condition that presents a potential traffic hazard to other drivers. For example, if the engine stalls at an intersection, the driver will impede the flow of traffic through that intersection until the engine has been enabled or the car is removed from the intersection.

The system preferably includes a switch that is manually activated by the driver to generate the beacon signal. FIG. 3 illustrates one example of such a switch 60. In this example, the switch 60 is a hazard light switch to activate flashing hazard lights 62 on the vehicle 20. Whenever the driver activates the hazard lights by manipulating the switch 60, the transceiver 54 preferably responsively is activated to generate the beacon signal to be transmitted from the antenna 24. The beacon signal preferably provides an indication to other navigation systems on other vehicles that the vehicle represents a potential traffic hazard at the current location.

The beacon signal preferably provides location information of the vehicle 20. In some embodiments, the beacon signal also includes information regarding the nature of the vehicle condition, such as an indication that the vehicle was involved in an accident or the engine has stalled. The driver can utilize the input switches 40 to cause an appropriate signal to be generated.

In another example, the beacon signal is sometimes generated automatically without requiring manual switch operation. In one embodiment, the controller 32 is programmed to recognize when the vehicle 20 is not travelling as would be expected given the current vehicle location. For example, when the controller 32 determines that the vehicle is on an expressway where the speed limit is 55 miles per hour and the controller 32 also determines that the vehicle is not moving, that serves as an indication that the vehicle is not travelling as should be expected given the current vehicle position. The controller 32 preferably is programmed to monitor such conditions and determine when it is likely that a traffic condition exists at the current vehicle location that warrants generating a beacon signal indicating the situation to alert other drivers having suitable vehicle navigation systems.

Another example where the beacon signal is automatically generated is when an airbag within a vehicle has been deployed, the controller 32 determines that the vehicle has been involved in an accident and, accordingly, causes the beacon signal to be generated. The controller 32 preferably is programmed to recognize a variety of situations where a beacon signal would be useful and causes the beacon signal to be generated accordingly.

Given this description, those skilled in the art will be able to choose from commercially available components and to design any specific circuitry or software that is necessary to accomplish the results provided by this invention.

The description just given provides, through the example of the currently preferred embodiments, example implementations of this invention. Variations and modifications to the disclosed embodiments may become apparent to those skilled in the art that do not necessarily depart from the purview and spirit of this invention. The scope of legal protection given to this invention can only be limited by the following claims.

We claim:

1. A vehicle navigation system mountable on a first vehicle that is to be navigated, comprising:
   an input module that allows a vehicle operator to input a desired destination location;
   a receiver supported on the vehicle that receives signals indicative of a current position of the first vehicle;
   a memory module that contains a prestored map database that includes a plurality of known location reference points;
   an update module that receives a travel advisory signal indicative of a current traffic situation that is not contained in the prestored map data base;
   an electronic controller that communicates with the update module, the input module, the receiver and the memory module and automatically generates a route guidance strategy to guide the operator from the current position to the desired location taking the travel advisory signal into consideration; and
   a transmitter supported on the first vehicle that transmits a beacon signal adapted to be automatically received by another vehicle for updating a route guidance strategy of the other vehicle, said beacon signal indicating to the other vehicle that the first vehicle represents a potential traffic hazard at the current position by including information identifying an abnormal vehicle condition of the first vehicle.

2. The system of claim 1, wherein the travel advisory signal comprises at least one of the group consisting of a beacon signal from another vehicle, a safety warning signal, an intelligent highway signal, a collision avoidance signal and an encoded radio signal indicating a traffic condition.

3. The system of claim 1, wherein the electronic controller periodically communicates with the update module and wherein the electronic controller generates an updated route guidance strategy responsive to another travel advisory signal.

4. The system of claim 3, wherein the electronic controller continuously communicates with the update module and generates another route guidance strategy responsive to another travel advisory signal.

5. The system of claim 3, further comprising a display that provides a visible display indicating the route guidance strategy and information representing the current situation corresponding to the travel advisory signal.

6. The system of claim 5, further comprising a speaker that provides an audible indication of selected portions of the route guidance strategy and audible information representing the current situation corresponding to the travel advisory signal.

7. The system of claim 1, wherein the beacon signal includes information indicative of the position of the first vehicle relative to the prestored map database.

8. The system of claim 1, further comprising a switch that is selectively activated to activate the transmitter to generate the beacon signal.

9. The system of claim 8, wherein the first vehicle includes hazard lights and the switch is automatically activated when the hazard lights are activated.

10. The system of claim 1, wherein when the electronic controller automatically determines that the first vehicle presents a potential current traffic situation, the electronic controller automatically activates the transmitter to transmit the beacon signal.

11. A vehicle navigation system mountable on a first vehicle, comprising:
    a receiver that receives signals generated remotely from the first vehicle which are indicative of a current position of the first vehicle relative to preestablished reference points;
    an electronic controller that communicates with the receiver and determines the current position of the first vehicle; and
    a transmitter that selectively transmits a beacon signal adapted to be automatically received by another vehicle, said beacon signal indicating to the other vehicle that the first vehicle represents a potential traffic hazard at the current position by including information identifying an abnormal vehicle condition of the first vehicle.

12. The system of claim 11, wherein the beacon signal includes information of the position of the first vehicle relative to the reference points.

13. The system of claim 11, further comprising a switch that is manually activated to activate the transmitter to generate the beacon signal.

14. The system of claim 13, wherein the first vehicle includes hazard lights and the switch is simultaneously activated when an operator of the first vehicle activates the hazard lights.

15. The system of claim 11, wherein when the electronic controller automatically determines that the first vehicle presents a potential current traffic hazard, the electronic controller automatically activates the transmitter to transmit the beacon signal.

16. A method of operating a vehicle navigation system having a receiver that receives signals indicative of a current position of the vehicle relative to established reference points on a prestored map database, the vehicle navigation system being mountable on a first vehicle that is to be navigated, said method comprising the steps of:
    (A) determining a current position of the first vehicle from the received signals;
    (B) determining a desired destination position for the first vehicle;
    (C) determining a current traffic situation that is not stored on the map database based upon a received traffic advisory signal;
    (D) determining a route guidance strategy using the current position of the vehicle from step (A), the desired destination from step (B), the map database and the current traffic situation from step (C); and
    (E) when the first vehicle presents a potential traffic hazard, transmitting a beacon signal adapted to be automatically received by another vehicle, said beacon signal indicating to the other vehicle that the first vehicle represents a potential traffic hazard at the current position by including information identifying an abnormal vehicle condition of the first vehicle.

17. The method of claim 16, wherein steps (C) and (D) are performed repeatedly and the method includes determining an updated route guidance strategy responsive to another current traffic situation from step (C).

* * * * *